United States Patent Office.

JEAN MARIE MUTERSE AND HENRI GUIBERT DE VALORY, OF GUÉRANDE, FRANCE.

Letters Patent No. 95,036, dated September 21, 1869.

IMPROVED COMPOSITION FOR USE IN FIRE-EXTINGUISHERS.

The Schedule referred to in these Letters Patent and making part of the same.

*To all whom it may concern:*

Be it known that we, JEAN MARIE MUTERSE and HENRI GUIBERT DE VALORY, both of Guérande, in the department of the Loire Inférieure, in the Empire of France, have invented "A Novel Liquefiable Compound Substance, to be Used for Extinguishing Fires;" and we do hereby declare that the following is a full and exact description thereof.

The nature of our invention consists in a novel and practical application of the well-known fire-extinguishing property of chlorhydric gas.

Our novel compound substance is obtained in a pulverulent form, and we term it "flame-extinguishing powder," or "anti-flame." It is perfectly soluble in water, and its composition is principally based upon the utilization of the residuum of salt-marshes, or pits, and particularly of the mother-waters, taking, as far as practicable, only the chloride of magnesium, which they contain, (the sulphates of magnesia and of soda, which enter into their composition, not yielding the desired gas;) but this chloride, not being very manageable commercially, we have found it necessary to associate it with the other part of the residuum of salt-marshes capable of absorbing it, also, with the refuse (itself very chloritic) obtained in the annual cleaning of the crystallizing basins of salt-works.

*Composition of Our Novel Liquefiable Compound Substance, or Flame-Extinguishing Powder.*

The component parts of our compound substance are:

Magnesian aluminous silicates, from salt-marshes, in a very fine powder, and dried at a heat of 212° "Fahrenheit," seven hundred parts by weight.

Chloride of magnesium, in crystals, two hundred parts by weight.

Sulphate of soda, fifty parts by weight.
Chloride of lime, fifty parts by weight.
Tartaric acid, one part by weight.
Total, one thousand and one parts by weight.

The proportions given are those which we prefer, but they are necessarily variable with the strength of the ingredients and of the product sought.

The above-enumerated ingredients are first pulverized, and then mixed together by ordinary and well-known means, the compound substance being delivered to commerce in powder, and in casks of from two to twenty hundred-weight, and in packets of from two to twenty pounds, or in the form of cartridges.

*Application and Action of Our Flame-Extinguishing Compound.*

The powder is liquefied by being added to the water to be thrown on to the fire, and may, consequently, be applied by any ordinary fire-engine. The effect of its application is, that it suddenly lowers the temperature, and, further, its contact with flame also evolves gases absolutely inimical thereto, whatever may be the substance feeding it, whether wood, charcoal, any vegetable or animal matter, and even hydrogenated carburets, such as oil, alcohol, tar essence, or petroleum, the inflammability of which is actually favored by the application of water in its natural state.

The addition of our fire-extinguishing "powder," or "anti-flame," rendering the water more efficacious, less is required for extinguishing a fire—a great advantage where the water-supply is limited or procured with difficulty, and in every case a great saving of time and labor.

One ton of our compound substance in fifteen tons of water will be as efficacious as one hundred and fifty tons of water without such addition.

What we claim as our invention, and desire to secure by Letters Patent, is—

1. The within described fire-extinguishing compound, in the form of a dry powder, adapted for ready diffusion and quick solution in water, composed of the combination of ingredients, and in about the proportions herein set forth.

2. The cartridge herein described, composed of the within-described antiphlogistic powder, or its equivalent.

J. M. MUTERSE.
H. GUIBERT DE VALORY

Witnesses:
J. HARTHE, of *Guérande.*
T. DE PIETRA SANTA, of *Guérande.*